United States Patent [19]

Schultze et al.

[11] Patent Number: 4,588,565

[45] Date of Patent: May 13, 1986

[54] SEPARATION OF LITHIUM CHLORIDE FROM IMPURITIES

[75] Inventors: Lawrence E. Schultze, Sparks; Donald J. Bauer; Ronald M. Arington, both of Reno, all of Nev.

[73] Assignee: The United States of America as represented by the Secretary of the Interior, Washington, D.C.

[21] Appl. No.: 636,765

[22] Filed: Aug. 1, 1984

[51] Int. Cl.$^4$ ............................................. C01D 15/04
[52] U.S. Cl. ........................... 423/179.5; 23/293 R; 159/47.1
[58] Field of Search ................. 423/179.5; 23/293 R; 159/47.1

[56] References Cited

U.S. PATENT DOCUMENTS

| | | | |
|---|---|---|---|
| 2,022,003 | 11/1935 | Kepfer et al. | 423/179.5 |
| 2,044,018 | 6/1936 | Rosett et al. | 423/179.5 |
| 2,533,246 | 12/1950 | Hayes et al. | 423/179.5 |
| 3,278,260 | 10/1966 | Hermann | 423/179.5 |
| 4,274,834 | 6/1981 | Brown et al. | 423/179.5 |
| 4,307,066 | 12/1981 | Davidson | 423/179.5 |

FOREIGN PATENT DOCUMENTS 506683  10/1954  Canada ............................ 423/179.5

OTHER PUBLICATIONS

Chemical Abstracts Citation 83(12) 104179v.

*Primary Examiner*—John Doll
*Assistant Examiner*—Wayne A. Langel
*Attorney, Agent, or Firm*—E. Philip Koltos; Thomas Zack

[57] ABSTRACT

Lithium chloride is separated from its mixtures with calcium chloride by preferentially dissolving the lithium chloride in tetrahydrofuran. The separation is achieved since the lithium chloride is soluble in tetrahydrofuran, while the calcium chloride is not. The process is particularly applicable to geothermal brines.

6 Claims, No Drawings

SEPARATION OF LITHIUM CHLORIDE FROM IMPURITIES

TECHNICAL FIELD

This invention relates to the separation of lithium chloride from impurities in a solution, particularly to the separation of lithium chloride from calcium chloride. The method may be used in any lithium recovery process, for instance, in recovery of lithium chloride from geothermal brines.

BACKGROUND OF THE INVENTION

Lithium chloride is a high value, potential byproduct of power generation from geothermal brines. Usage of lithium is increasing, and the United States is the major supplier to nonproducing countries. Prior art recovery of lithium from brines involves either complicated and time-consuming extraction methods, principally extraction in alcohol, addition of large amounts of costly reagents to precipitate the lithium, or the use of ion-exchange resins, which limits the volume of brine to be treated at any one time.

For example, U.S. Pat. No. 3,537,813 to Nelli et al. discloses a process for recovering lithium from brines comprising adding a chloride or bromide of a metal selected from a group consisting of ferric iron, cobalt and nickel to liquid brine under acidic conditions, allowing the metal chloride to react with the lithium salts such as lithium chloride, to produce a soluble compound, extracting the soluble compound with water insoluble organic solvents, reextracting the compound from the organic solvent with water, and separating the lithium salt from the metallic chloride or bromide. This method has the disadvantage of requiring addition of large amounts of costly reagents. Also, the lithium chloride, which has been extracted from the organic solvent, must then go through another recovery step to separate it from the metallic chloride or bromide compound.

U.S. Pat. No. 4,159,311 to Lee et al. teaches a process for removing lithium from aqueous brines comprising contacting the brine with an anion exchange resin so that the lithium is adsorbed onto the resin, and eluting the lithium from the resin by contacting it with an aqueous wash liquor. This process has the disadvantage that only a limited amount of the brine can be processed at any one time. The method is therefore time consuming and costly.

U.S. Pat. No. 4,271,131 to Brown et al. discloses a lengthy process for separation of lithium chloride from brines. The process consists of subjecting the brine to a first solar evaporation step to concentrate the brine and precipitate sodium and potassium chlorides, adding slaked lime to the brine during the first evaporation step to precipitate magnesium, subsequently adding slaked lime and calcium chloride to precipitate sulfate as calcium sulfate dihydrate, separating the precipitated calcium sulfate dihydrate from the brine, subjecting the brine to a second solar evaporation to further concentrate lithium chloride and to precipitate magnesium hydroxide, calcium sulfate dihydrate and calcium borate hydrate, heating the concentrated brine to a temperature above 101° C. to remove the remaining water, heating the remaining salts to a temperature above 200° C., cooling the salts, and extracting the lithium chloride with isopropanol. This process also has the disadvantage of being complicated and time-consuming, and therefore inefficient and costly.

U.S. Pat. No. 4,274,834 to Brown et al. also discloses a process for purification of lithium chloride using an isopropanol extraction. The process comprises evaporating the lithium chloride-containing solution which also contains sodium, potassium, calcium, boron, sulfate and/or organic compounds as impurities, heating the recovered salts to a temperature in the range of 270°–325° C., cooling the lithium chloride to ambient temperature, extracting the lithium chloride with isopropanol, and recovering the solid lithium chloride product. This method has the disadvantage that the salt mixture must be heated to very high temperatures.

U.S. Pat. No. 4,307,066 to Davidson teaches a process for extraction of lithium or calcium from a mixture of metal oxides and silicates by reacting the mixture with a chlorinating agent comprising a gaseous $H_2O$-HCl mixture at a temperature of 300°–1200° C. and subsequently water leaching the metal chlorides from the resulting mixture. This method has the disadvantage that the salt mixture must be heated to a very high temperature.

While these prior art methods successfully separate lithium chloride from alkali metal chlorides, they do not separate lithium chloride from calcium chloride. Lithium chloride and calcium chloride have a very similar solubility rate, particularly in alcohol. It is therefore difficult to dissolve one while leaving the other undissolved.

Application of this invention to recovering lithium chloride from a geothermal brine is fully described in the U.S. Department of the Interior-Bureau of Mines Report of Investigations 8883, *Recovering Lithium Chloride From a Geothermal Brine*, by L. E. Schultze and D. J. Bauer, 1984.

SUMMARY OF THE INVENTION

It is therefore an object of this invention to provide a method for separating lithium chloride from calcium chloride.

It is a further object of this invention to provide a simple, inexpensive, efficient method of extracting lithium from brines.

Other objects and advantages of the invention will become apparent as the description thereof proceeds.

In satisfaction of the foregoing objects, the present invention provides a method for recovering substantially pure lithium chloride from lithium chloride-calcium chloride salt mixtures comprising the steps of: preferentially dissolving the lithium chloride from the lithium chloride-calcium chloride mixture in tetrahydrofuran, so that the calcium chloride remains undissolved, separating the insoluble calcium chloride from the tetrahydrofuran, and evaporating the tetrahydrofuran to recover the lithium chloride.

The method has application to many different processes, particularly the recovery of lithium from geothermal brines. Such recovery is accomplished by the method of adding a soluble aluminum salt, preferably as aluminum chloride, precipitating the aluminum and lithium as hydroxides, redissolving the precipitate in hydrochloric acid, treating the acid solution to remove aluminum and sodium, evaporating the solution to leave a solid residue, preferentially dissolving the lithium chloride in tetrahydrofuran, separating the insoluble calcium chloride from the tetrahydrofuran, and evaporating the tetrahydrofuran to recover substantially pure lithium halide.

DETAILED DESCRIPTION OF THE INVENTION

This invention provides a novel process for recovering substantially pure lithium chloride from calcium-containing solutions. Generally, the process provides for drying the lithium chloride-calcium chloride-containing solution to obtain a dry lithium chloride-calcium chloride residue, preferentially dissolving the lithium chloride from this residue in tetrahydrofuran (THF), removing the insoluble calcium chloride from the tetrahydrofuran solution, and evaporating the tetrahydrofuran to recover the substantially pure solid lithium chloride.

While this method of purifying lithium chloride has many potential uses, it is particularly applicable to the recovery of lithium chloride from geothermal brines. These brines contain mixtures of salts and various metals, which metals include Na, Ca, Li, Mg, K, and B. The invention is particularly described herein with reference to lithium chloride and chlorides of other metals. However, it is to be understood that the invention is inclusive of other operative halides.

A process for the recovery of lithium chloride from brine comprises the following steps.

(1) An aluminum salt is added to a lithium-containing brine, and the pH is increased to the alkaline range with a base to form a precipitate. Any aluminum salt may be used to react with the lithium in the mixture, although aluminum chloride is preferred. At least a sufficient amount of aluminum ion, and preferably an excess amount, should be added to react with the lithium contained in the mixture. The pH is then increased to the alkaline range, preferably 7.0 to 9.0, and most preferably 7.5, by addition of a base to cause solids precipitation. While lime is the preferred base used to raise the pH, any base can be used, such as a compound of an alkali or alkaline earth metal, especially the hydroxides and oxides.

(2) The precipitate is then treated to remove aluminum and sodium by dissolving the precipitate in a mineral acid such as hydrochloric acid, so that the resulting solution has a pH of approximately 2 or below, and sparging the solution with gaseous hydrochloric acid so that the aluminum and sodium are precipitated as chlorides. The step for removing aluminum and sodium by this method is fully disclosed in copending application Ser. No. 460,201, and disclosure of this copending application is hereby expressly incorporated herein by reference.

(3) The resultant mixed chlorides remaining in solutions are then dried and crushed to a fine mesh powder. The mixture may be dried by any method, although spray drying is preferred. Further, it may be dried at any temperature from ambient to 200° C. The mixture is crushed preferably to a mesh size in the range of about −20 to −50 mesh, preferably −35 mesh.

(4) The mixture is then contacted with tetrahydrofuran at about ambient temperature. In the preferred method, the mixture is added to the tetrahydrofuran with agitation. The temperature is in the range from 15° C. to 35° C.

(5) The insoluble calcium chloride is then removed from the tetrahydrofuran. Any separation method which allows separation of a solid residue can be used. Separation methods include filtering or centrifuging the tetrahydrofuran to remove the residue.

(6) The tetrahydrofuran is then evaporated. The preferred evaporating method involves heating the tetrahydrofuran, e.g., up to 66° C., and allowing the liquid to vaporize. Other methods include placing the tetrahydrofuran in an evacuated chamber at 25° C. and allowing the liquid to evaporate.

(7) Substantially pure lithium chloride is recovered.

This invention is an improvement over the prior art in providing for an inexpensive, rapid, efficient method for the separation of lithium chloride from calcium chloride. This has always been difficult since the solubilities of lithium compounds and calcium compounds are very similar in a number of solvents. However, while most metal chlorides have ionic chemical bonds, the lithium chloride bond is covalent in nature. Therefore, lithium and calcium compounds can be separated according to the invention by preferentially dissolving the lithium chloride in a solvent which preferentially dissolves covalent compounds, while excluding ionic compounds.

Tetrahydrofuran is a solvent of this type. The maximum solubility of lithium chloride in tetrahydrofuran is 54 g/l. That of calcium chloride in tetrahydrofuran is 0.2 g/l. Therefore, the tetrahydrofuran preferentially dissolves the lithium chloride while excluding the calcium chloride. However, the solubility of calcium chloride is dependent upon the amount of lithium chloride dissolved in the tetrahydrofuran. For example, a solution of tetrahydrofuran containing 24 g of lithium chloride per liter will dissolve 3.6 g of calcium chloride per liter. The increased solubility of calcium chloride is apparently due to the alteration of the solvent characteristics of tetrahydrofuran which contains lithium chloride.

A test was conducted to determine the effect of hydration on the solubility of lithium chloride and calcium chloride in tetrahydrofuran. The test was conducted on a dried mixture of the salts. The salts were dried at temperatures up to 200° C. The lithium chloride monohydrate loses its waters of hydration at 98° C., and calcium chloride dihydrate loses its waters of hydration at 200° C. Dehydration of the chloride salts exhibited no effect on the solubility of either salt in tetrahydrofuran.

Therefore, it is not necessary to dry the lithium chloride-calcium chloride salt mixture at high temperatures to drive off the waters of hydration before performing the method of the invention.

The following examples are presented to illustrate the invention, but it is not to be considered as limited thereto. In the examples, parts are by weight unless otherwise indicated.

EXAMPLE I

Aluminum chloride was added to a lithium containing brine, and the pH of the treated brine was increased to 7.5 by addition of lime. A precipitate formed. The precipitate was treated to remove aluminum and sodium by dissolving the precipitate in hydrochloric acid so that the resulting solution has a pH of 2, and sparging the solution with gaseous hydrochloric acid, thereby precipitating the aluminum and sodium as chlorides. The resultant mixed chlorides remaining in solution were dried at 200° C. and crushed to −35 mesh. A 138 g sample of the mixture was contacted with 1 liter of tetrahydrofuran at ambient temperature. The salt mixture, insoluble residue of the tetrahydrofuran, and tetrahydrofuran-soluble salts were analyzed by inductively coupled plasma. The mass distribution of the metals is shown in Table I:

TABLE I

| Metal | Mass Distribution of Metals | | |
|---|---|---|---|
| | Wt in salt mixture (mg) | Wt in residue (mg) | Wt in THF (mg/l) |
| Al | 210 | 270 | ND |
| Ba | 180 | 180 | ND |
| B | 350 | 380 | ND |
| Ca | 30,000 | 27,000 | 2,300 |
| Fe | 770 | 760 | 18 |
| Pb | 88 | 85 | 21 |
| Li | 3,200 | 220 | 3,100 |
| Mg | 1,300 | 1,200 | 180 |
| Mn | 2,000 | 490 | 1,700 |
| K | 5,500 | 5,900 | 46 |
| Na | 480 | 490 | 21 |
| Si | 260 | 250 | 6 |
| Zn | 830 | 190 | 700 |

(ND = not detected)

Table I shows that the lithium content was increased from 7% in the original salt mixture to 38% in the tetrahydrofuran. The purification step rejected 92% of the calcium and recovered 93% of the lithium. Most of the remaining constituents may be removed by precipitation as oxalates.

EXAMPLE II

A mixture of salts was prepared by blending 56.3 g chloride dihydrate, 10.1 g of lithium chloride, of calcium 5.6 g of magnesium chloride hexahydrate, 5.4 g of potassium chloride, and 2.3 g of sodium borate decahydrate. The hydrated salt mixture was contacted with 250 ml tetrahydrofuran. Table II shows the mass distribution of the metals:

TABLE II

| Metal | Mass Distribution of Metals | | |
|---|---|---|---|
| | Wt in residue (mg) | Wt in THF (mg) | Conc. in THF (mg/l) |
| B | 475 | ND | ND |
| Ca | 15,500 | 900 | 3,600 |
| Li | 1,050 | 875 | 3,500 |
| Mg | 425 | 325 | 1,300 |
| K | 3,750 | 22 | 88 |

(ND = not detected)

The high level of lithium in the residue is due to the tetrahydrofuran being almost saturated with lithium chloride. Potassium, boron and the bulk of the calcium are rejected by tetrahydrofuran.

EXAMPLE III

A solution was prepared by dissolving 29.7 g of lithium chloride and 78.2 g of calcium chloride dihydrate in 350 ml of water. The solution was spray dried at 182° C. and 10 g of the dried salts were contacted with 100 ml of tetrahydrofuran. The tetrahydrofuran dissolved 2.7 g of lithium chloride and 0.5 g of calcium chloride. The insoluble residue contained 0.09 g of lithium chloride and 6.1 g of calcium chloride. The lithium chloride content of the mixture was increased from 28% to 84%.

EXAMPLE IV

A mixture of calcium chloride dihydrate and lithium chloride containing 2.2 g of calcium and 0.51 g of lithium was prepared with no heat treatment of the salt mixture, and contacted with 100 ml of tetrahydrofuran. The insoluble residue of the tetrahydrofuran contained 1.9 g of calcium and 0.05 g of lithium. The lithium to calcium ratio in the tetrahydrofuran was the same as obtained when the salt mixture was dried at 182° C., as in Example III.

The invention has been described herein with reference to certain embodiments. However, as obvious variations thereon will become apparent to those skilled in the art, the invention is not considered to be limited thereto.

We claim:

1. A method for the separation of lithium chloride from calcium chloride comprising:
   (a) preferentially dissolving lithium chloride from a lithium chloride-calcium chloride mixture in tetrahydrofuran, thereby forming a tetrahydrofuran solution, so that insoluble calcium chloride is not dissolved;
   (b) separating the tetrahydrofuran solution from the insoluble calcium chloride; and
   (c) evaporating the tetrahydrofuran containing substantially pure lithium chloride.

2. A method according to claim 1 wherein the lithium chloride-calcium chloride mixture is obtained by drying a lithium chloride-calcium chloride-containing solution to form a dried salt mixture.

3. A method for recovering lithium chloride from calcium-containing brines comprising:
   (a) adding a soluble aluminum salt to the brine;
   (b) adjusting the pH of the brine to alkaline to form an aluminum and lithium hydroxide precipitate;
   (c) redissolving the precipitate in hydrochloric acid to form a solution containing aluminum, lithium and sodium;
   (d) sparging the solution with gaseous hydrochloric acid to remove aluminum and sodium chlorides as a residue, thereby forming a second solution;
   (e) separating the second solution from the residue;
   (f) evaporating said second solution to form a second residue containing lithium chloride;
   (g) preferentially dissolving lithium chloride contained in the second residue in tetrahydrofuran;
   (h) separating the tetrahydrofuran from the second residue;
   (i) evaporating the tetrahydrofuran to recover substantially pure lithium chloride.

4. A method according to claim 3 wherein the soluble aluminum salt is aluminum chloride.

5. A method according to claim 3 wherein the base in step (b) is an oxide or hydroxide of an alkali metal or alkaline earth metal.

6. A method according to claim 5 wherein sufficient base is added to raise the pH to the range of 7.5 to 9.0.

* * * * *